Jan. 3, 1950     H. SARTIN     2,493,422
COTTON STRIPPER HAVING AUXILIARY PNEUMATIC MEANS
Filed Feb. 5, 1946     3 Sheets-Sheet 1
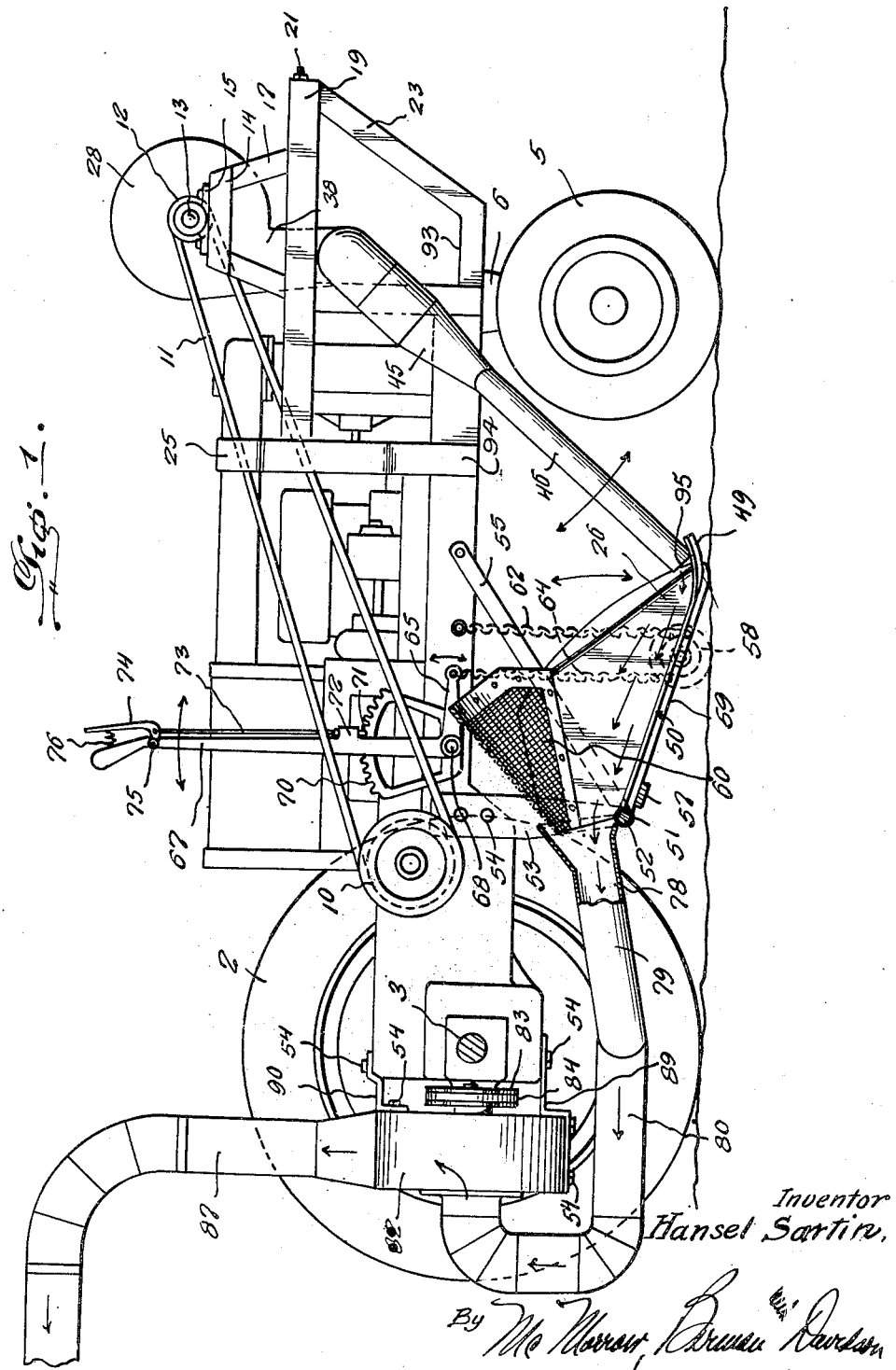
Inventor
Hansel Sartin,
By
Attorneys

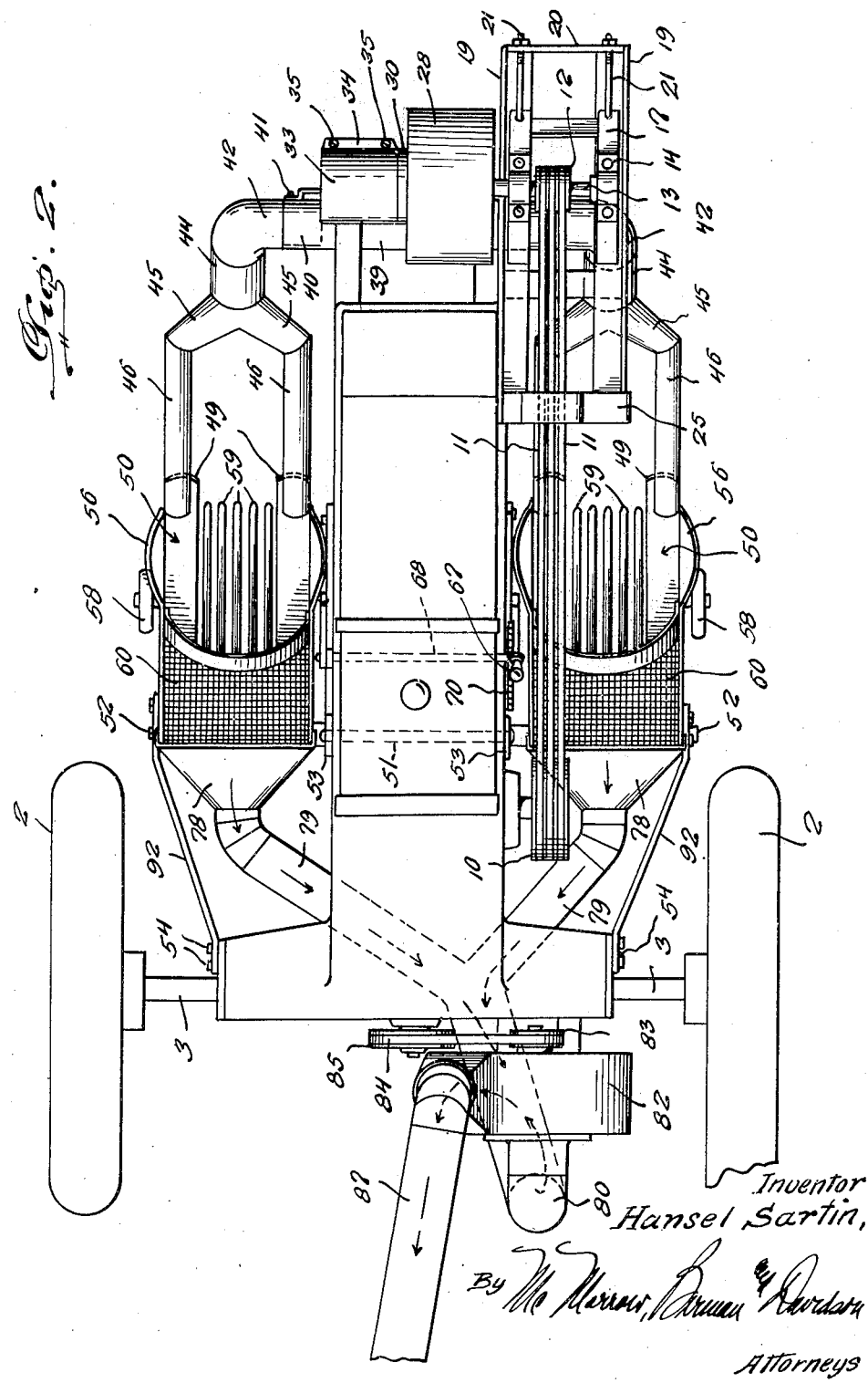

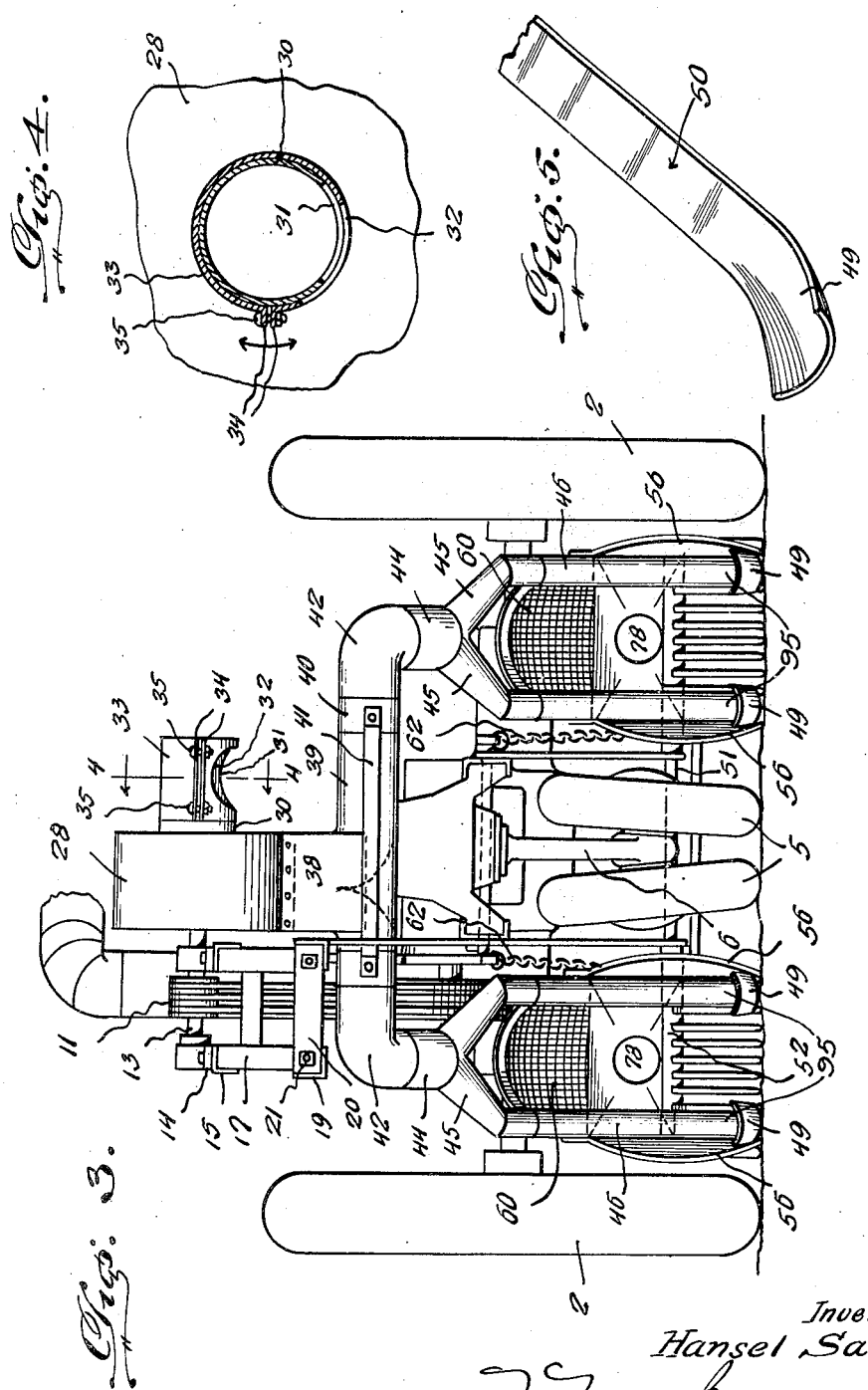

Patented Jan. 3, 1950

2,493,422

UNITED STATES PATENT OFFICE 2,493,422

COTTON STRIPPER HAVING AUXILIARY PNEUMATIC MEANS

Hansel Sartin, Slaton, Tex.

Application February 5, 1946, Serial No. 645,614

2 Claims. (Cl. 56—30)

This instant application is a continuation in part of my copending application 576,565, filed February 7, 1945, now abandoned, for Skeleton cotton picker, and relates to a cotton picker of the blower type.

The main object of the invention is to provide a cotton picking mechanism mounted on a conventional tractor and including a plurality of spaced fingers which pass between the branches of the cotton plant and strip the cotton off during the movement of the tractor over the field.

Another object of the invention is the provision of pneumatic means operated by the tractor for carrying the cotton on the fingers to a vehicle towed by the tractor.

Still another object of the invention is the provision of an implement of the class described and of simple, durable and economical construction.

Another object of the invention is the provision of an implement including pneumatic means pivoted to the tractor and supported by the cotton picking mechanism in operative and inoperative position.

With these and other objects and advantages in view the invention resides in the novelty of construction, combination and arrangement of parts hereinafter described in detail and claimed in the appended claims.

The description should be read in connection with the accompanying drawings wherein—

Figure 1 is a side elevation of the preferred embodiment of my invention, partly in section;

Figure 2 is a top plan view;

Figure 3 is a front end view;

Figure 4 is an enlarged transverse detail section on line 4—4 of Figure 3;

Figure 5 is a fragmentary perspective view of the air deflector.

In the drawings in which like characters of reference designate like or similar parts, Figures 1 to 3 show a conventional farm tractor including rear wheels 2 spaced from one another to an extent permitting these wheels to straddle two rows of cotton, rear axle 3, a pair of front or steering wheels 5 relatively close together and therefore adapted to run between the rows. The front wheels are journaled on shafts extending from opposite sides of the lower end of an axle support 6 journaled with its upper end in the tractor.

The tractor has a V-pulley 10 connected by a V-belt 11 to a smaller V-pulley 12 the shaft 13 of which is journaled in a pair of bearings 14 disposed forwardly of the tractor and each supported on horizontal angles 15 welded or otherwise secured at either end to the upper ends of a pair of downwardly diverging struts 17. The lower ends of the same are carried by the horizontal confronting flanges of a pair of angles 19 connected at their forward ends by a tie 20. The lower end of each forward strut 17 is joined by a rod 21 to the tie (Figure 2). The inner angle 19 is connected at its front end to the upper end of a downwardly and rearwardly extending brace 23 having a horizontal portion 93 affixed at its rear end to the front part of the tractor frame. A substantially rectangular frame 25 is arranged with its plane vertically disposed and attached by one of its vertical members 94 to one side of the forward part of the tractor frame. The vertical side members of frame 25 are each secured to the rear end of the angles 19. A downwardly and inwardly extending brace 26 supports the outer lower end of frame 25 and is attached at its lower end to the side of the front part of the tractor frame.

The pulley shaft 13 extends to the left of its left-hand bearing into a substantially cylindrical blower housing 28 suitably carried by the tractor frame and drives a blower (not shown). From the left-hand side wall of the housing extends a horizontal pipe 30 communicating with the interior thereof and closed at its outer end. An air opening 31 is provided in the lower peripheral wall of pipe 30 and is adapted to be brought into registry with a similar opening 32 of a split sleeve 33 including radial lugs 34 apertured for insertion of tightening bolts 35. By this means the pressure of air produced by the blower may be controlled through rotational adjustment of sleeve 33 on pipe 30 whereby the openings 21 and 32 can be placed in complete or restricted registration, or, if desired, in non-registration.

In communication with the interior of the blower housing and connected to the lower part thereof is a conduit 38 having at its lower and laterally extending branches 39 each joined at its outer end to an extension 40. A tie 41 riveted at either end to an extension assures the connection of the latter to the branches 39. Elbows 42 are each pivotally connected at their inner and forward ends to one of the pipe extensions and are disposed in rearwardly declining planes and attached at the lower rear ends to the upper end of a branch connection 44 dividing into diverging branches 45 each affixed at its lower end to one of the parallel rearwardly declining pipes 46.

The lower open ends 95 of the same each overlie the transversely curved lower front end 49 of an air deflector 50 the rear end of which is welded or otherwise secured to the end portion of a hinge barrel 51. Thus a pair of deflectors in spaced relation are pivoted by such a barrel on a horizontal shaft 52 extending outwardly from the lower end of bracket 53 which is affixed by fasteners 54 to one side of the tractor frame. The inner end of the shaft is also held by the lower end of a forwardly rising brace 55 the upper forward end of which is attached to the same side of the tractor by fastener 54.

Along the outer edges of the deflectors extend outwardly bulging casing walls 56 of trapezoidal shape which are connected at their lower rear ends to one end of the hinged barrel and further connected near their ends to one another by a horizontal tie 57 underlying the deflectors and a plurality of spaced teeth or fingers 59 disposed between the deflectors. These fingers are welded or otherwise affixed to the hinge barrel. A hood 60 of wire netting or the like connects the rear part of the upper marginal portions of a pair of walls 56 on one side of the tractor. To the outer side of each side wall and near the lower edge thereof is connected a small ground wheel or roller 58.

To the forward part of the lower edge of the inner wall is connected the lower end of a chain 62 or other flexible member of a length sufficient to suspend the picking assembly described closely above the ground and attached at the upper end to the tractor frame. Rearward of the chain 62 is a lifting chain 64 fastened with its lower end to the lower edge of the inner casing wall and with its upper end to the forward end of the shorter arm 65 of a bell crank also including a longer handle arm 67. The same is within easy reach of the driver on the seat of the tractor on one side thereof and fixed upon the right-hand end of a shaft 68 projecting beyond the same side of the tractor and extending transversely thereof. This shaft is mounted for limited rotation in the tractor and extends also beyond the left side thereof and carries upon its extending part a lever arm 65 similar and disposed in parallelism to the arm 65 previously described, the latter lever arm 65 having the upper end of a lifting chain, not shown, likewise disposed on the left side of the tractor and similar to the previously described lifting chain 64 on the right side of the tractor. The lever arm 65 and lifting chain on the left side of the tractor have a similar function as the arm 65 and the lifting chain 64 on the right side of the tractor, i. e. that of lifting a picker assembly which is a substantial duplicate of the assembly mounted on the right side of the tractor and described. To the right-hand side of the tractor and inwardly of the lever 65, 67 is fixed a toothed segment 70 the teeth of which coacts with the lower end of a pawl 71 slidable in a guide 72 attached to the handle arm 67. The pawl is pivoted at its upper end to a rod 73 which is pivotally connected at its upper end to a bent finger lever 74 fulcrumed at 75 upon the handle arm 67 and urged by a spring 76 to the position of Figure 1 in which the pawl is inserted between a pair of adjacent segment teeth.

Rearwardly of each picker assembly is the forwardly flaring mouth piece 78. The mouth pieces form the forward ends of a pair of rearwardly converging conveyor tubes 79 which connect to a tube 80 first extending rearwardly and then forwardly and in communication with the rear and low pressure side of a blower casing 82. A blower (not shown) operates within the casing and is connected to a pulley 83 on the outside of the casing and coupled by belt 84 to a power take-off pulley 85 driven by the tractor motor.

To the top and high pressure side of blower housing 82 is connected the lower end of a conveyor tube 87 first rising vertically and then projecting rearwardly above the front wall of the body of the vehicle 8.

The housing 82 is attached at the bottom by fasteners 54 to the rearwardly directed depressed part of a bracket 89 the raised forward part of which is affixed by fastener 54 to the underside of the tractor frame. The downwardly directed part of a bracket 90 is fastened by fastener 54 to the front side of the rear blower housing and includes a forwardly projecting part secured by fastener 54 to the rear top portion of the tractor.

To either side of the rear frame portion of the tractor and near the rear axle thereof is secured by fasteners 54 the rear end of a brace 92 which projects forwardly and outwardly and supports at its front end the outer end of a shaft 52.

When the implement described is in a shed or is run over a road to its field of operation, the picker assembly is held in a substantially horizontal position by the chain 64 and the hand lever 65, 67 is held in a rearwardly inclined position by the engagement of the pawl 71 with one of the rear teeth of the segment 70. When the picker assembly is in substantially horizontal and inoperative position, it supports the rear ends of pipes 46 which can pivot about a transverse horizontal axis owing to the pivotal connection between the horizontal leg of elbow 42 and the adjacent extension 41.

Upon arrival of the implement in its field of operation the lever 65, 67 is swung to the position of Figure 1 in which the picker assemblies are held in close relation above the ground by the chain 62.

To operate the picker described and shown the tractor is run over the field straddling two adjacent rows of cotton and both blowers are in operation. The picking fingers engage between the branches of the plant and beneath the cotton bolls and strip the latter from the former. The picking fingers together form in effect a table-like member above and upon which the stripped cotton bolls are deposited in a substantially common plane in the paths of the merging streams of positive and negative air pressure from the blower pipes 46 and the conveyor tubes 79 whereby the bolls are effectively carried into the conveyor tubes. The streams of air emerging from the lower ends of pipes 46 carry the cotton rearwardly and upwardly into the mouth pieces 78 whence the suction of the conveyor tubes carries the cotton into the body of the vehicle towed by the tractor.

While I have illustrated and described with particularity only a single preferred form of my invention, I do not desire to be limited to the exact structural details thus illustrated and described but intend to cover all forms and arrangements which come within the scope of my invention as defined by the appended claims.

What I claim and desire to protect by Letters Patent of the United States is:

1. In a cotton picker, a group of forwardly declining laterally spaced fingers for stripping bolls from cotton plants between the fingers as the picker is moved forwardly, vertical side walls rising on opposite sides of said group, forwardly declining deflectors extending longitudinally along the inner sides of said sidewalls and substantially on a level with the fingers of said group, a suction manifold behind said group comprising forwardly directed intake mouths located at the elevated rearward ends of said deflectors, a blower manifold comprising rearwardly declining blower tubes terminating at their lower ends in nozzles opening onto the forward ends of said deflectors, and means for blowing air through said nozzles so as to direct air rearwardly along the upper sides of said deflectors and along the inner sides of said sidewalls so as to drive stripped bolls along said group of fingers toward said suction manifold mouths while exerting suction through said suction manifold whereby stripped bolls arriving at the rearward end of said group of fingers are drawn into said suction manifold.

2. In a cotton picker, a group of forwardly declining laterally spaced fingers for stripping bolls from cotton plants between the fingers as the picker is moved forwardly, vertical side walls rising on opposite sides of said group, forwardly declining deflectors extending longitudinally along the inner sides of said sidewalls and substantially on a level with the fingers of said group, a suction manifold behind said group comprising forwardly directed intake mouths located at the elevated rearward ends of said deflectors, a blower manifold comprising rearwardly declining blower tubes terminating at their lower ends in nozzles opening onto the forward ends of said deflectors, and means for blowing air through said nozzles so as to direct air rearwardly along the upper sides of said deflectors and along the inner sides of said sidewalls so as to drive stripped bolls along said group of fingers toward said suction manifold mouths while exerting suction through said suction manifold whereby stripped bolls arriving at the rearward end of said group of fingers are drawn into said suction manifold, a screen extending between said sidewalls at the rearward ends thereof and above said suction mouths to confine rearwardly driven bolls between said sidewalls, said screen having a rearwardly declining portion terminating at the lower ends thereof in the regions of said suction mouths for directing rearwardly moving bolls into said suction mouths.

HANSEL SARTIN.

REFERENCES CITED

The following references are of record in the file of this patent:

UNITED STATES PATENTS

| Number | Name | Date |
|---|---|---|
| 359,724 | Hanks | Mar. 22, 1887 |
| 451,589 | Baldwin | May 5, 1891 |
| 485,430 | Riner | Nov. 1, 1892 |
| 1,122,375 | Engle | Dec. 29, 1914 |
| 1,400,522 | Cannon | Dec. 20, 1921 |
| 1,722,747 | Hentz | July 30, 1929 |
| 1,789,803 | Boone | Jan. 20, 1931 |
| 1,961,447 | Nisbet | June 5, 1934 |
| 2,013,816 | West | Sept. 10, 1935 |